(12) United States Patent
Iwamura et al.

(10) Patent No.: US 8,446,895 B2
(45) Date of Patent: May 21, 2013

(54) RADIO BASE STATION AND MOBILE STATION

(75) Inventors: Mikio Iwamura, Yokohama (JP);
Minami Ishii, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 212 days.

(21) Appl. No.: 12/934,391

(22) PCT Filed: Mar. 24, 2009

(86) PCT No.: PCT/JP2009/055795
§ 371 (c)(1),
(2), (4) Date: Dec. 7, 2010

(87) PCT Pub. No.: WO2009/119564
PCT Pub. Date: Oct. 1, 2009

(65) Prior Publication Data
US 2011/0069696 A1    Mar. 24, 2011

(30) Foreign Application Priority Data
Mar. 24, 2008  (JP) .................. P2008-076895

(51) Int. Cl.
*H04J 3/06*   (2006.01)
*H04L 12/28*  (2006.01)

(52) U.S. Cl.
USPC ............... 370/350; 370/431; 370/468

(58) Field of Classification Search
USPC ............ 370/400, 401, 431, 464–468, 345, 370/350
See application file for complete search history.

(56) References Cited

U.S. PATENT DOCUMENTS
2005/0249141 A1* 11/2005 Lee et al. .......... 370/312
2010/0165901 A1*  7/2010 Kim ................ 370/312
2010/0174809 A1*  7/2010 Chun et al. ......... 709/221

FOREIGN PATENT DOCUMENTS
JP    2007-243899 A    9/2007
JP    2007-325237 A   12/2007

OTHER PUBLICATIONS

3GPP TSG RAN WG1 Meeting #51, "Response to LS on transmission mode for BCCH," R1-075102, Nov. 5-9, 2007, 2 pages.
International Search Report issued in PCT/JP2009/055795, mailed on Jun. 30, 2009, with translation, 3 pages.
Written Opinion issued in PCT/JP2009/055795, mailed on Jun. 30, 2009, 3 pages.

* cited by examiner

*Primary Examiner* — Kerri Rose
(74) *Attorney, Agent, or Firm* — Osha Liang LLP (57) ABSTRACT

Provided is a radio base station eNB including a transmission timing decision unit and a system information transmission unit. The transmission timing decision unit decides a transmission radio frame according to an offset Xk from a transmission timing of a first system information SI-1 and a transmission cycle Tk for other system information k and decides a transmission sub-frame in a decided transmission radio frame according to scheduling information contained in the first system information SI-1. The system information transmission unit transmits other system information k in the decided transmission sub-frame. The offset Xk is defined so as to be different for each transmission cycle Tk.

12 Claims, 5 Drawing Sheets

RADIO BASE STATION AND MOBILE STATION

TECHNICAL FIELD

The present invention relates to a radio base station configured to transmit a first type of system information and one or multiple different types of system information to a mobile station, and relates to a mobile station configured to receive a first type of system information and one or multiple different types of system information from a radio base station.

BACKGROUND ART

Figure 2:
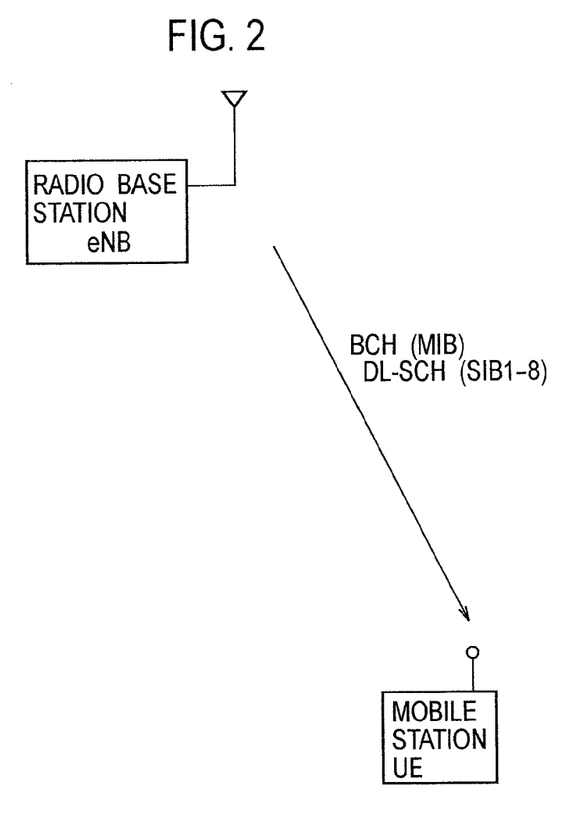
FIG. 2 is a view for explaining transport channels used to transmit System Information in a mobile communication system employing the LTE system.

In a mobile communication system employing the LTE (Long Term Evolution) system, a radio base station eNB is configured to transmit a MIB (Master Information Block) to a mobile station UE via a BCH (Broadcast Channel), and to transmit multiple types of system information to the mobile station UE via a DL-SCH (Downlink Shared Channel) as shown in FIG. 2.

Here, multiple SIB (System Information Block) 1 to SIB8 are mapped to the system information SI.

SIB1 includes information needed to judge whether or not to allow a mobile station UE to enter in standby mode, such as a PLMN-ID and a cell ID, and is always mapped to a first type of system information SI (System Information)-1.

Meanwhile, SIB2 to SIB8 are grouped and mapped respectively to different types of system information SI-2 and following signs.

It may be considered that each of the SIBs is a message including a specific information element, and that SI is a container for transporting each SIB.

SIB1 mapped to the first type of system information SI-1 is configured to broadcast scheduling information on the different types of system information SI-2 and following signs and to broadcast a transmission cycle T of each type of SI. Additionally, SIB1 is configured to broadcast mapping information between SIBs and SI.

A transmission cycle of the first type of system information SI-1 is fixed to 80 ms. Note that the first type of system information SI-1 can be transmitted repeatedly within 80 ms.

Meanwhile, transmission cycles of the different types of system information SI-2 and following signs are variable, and are assumed to be, for example, in a range of approximately 80 ms to 1.28 s.

Figure 1:
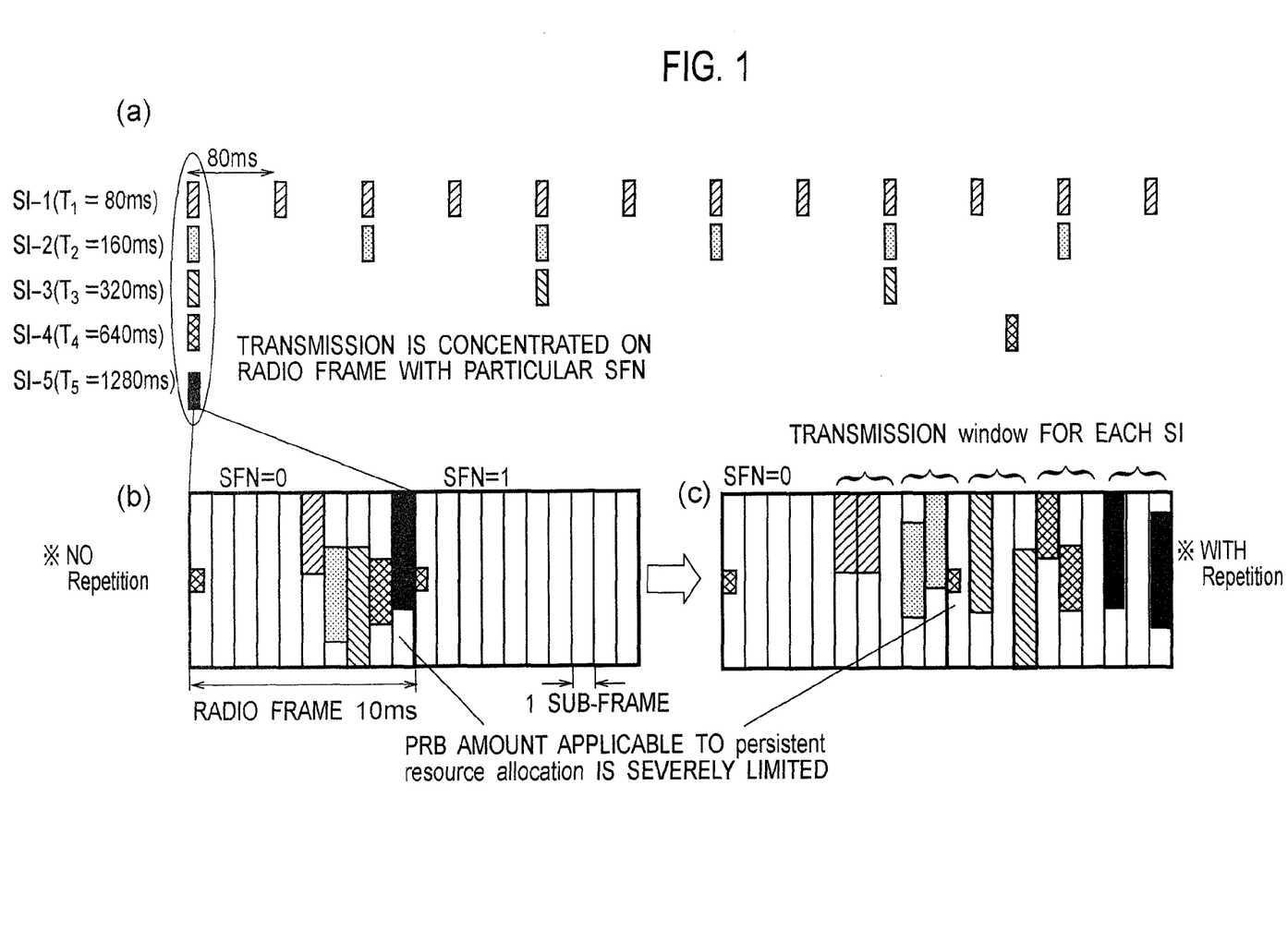
FIG. 1 shows views for explaining System Information transmitted by a radio base station in a conventional mobile communication system employing the LTE system.

As shown in FIG. 1(a), the radio base station eNB is configured to transmit each type of system information in a radio frame having a frame number SFN and satisfying "SFN mod (T/10)=0". Here, "T" is a transmission cycle of each type of system information. In case of SI-1, T is 80 ms.

Moreover, as shown in FIG. 1(b), the radio base station eNB is configured to transmit the first type of system information SI-1 in the sixth sub-frame in the radio frame satisfying "SFN mod T=0" via the DL-SCH.

In addition, the radio base station eNB is configured to determine a transmission sub-frame in a transmission radio frame (the radio frame SFN=0 in the example of FIG. 1(b)) for each of the different types of system information SI-2 and following signs on the basis of the scheduling information included in the first type of system information SI-1 (or SIB1).

Note that, as shown in FIG. 1(c), the radio base station eNB may be configured to repeatedly transmit each type of system information SI within a window.

However, in a conventional mobile communication system employing the LTE system, the radio base station eNB is configured to transmit each type of system information SI in the radio frame with the frame number SFN satisfying "SFN mod(T/10)=0". Accordingly, as shown in FIG. 1(a), there is a problem that the multiple types of system information SI are transmitted in a concentrated manner in a radio frame with a specific SFN.

Additionally, a conventional mobile communication system employing the LTE system has a problem that "Persistent Resource Allocation" such as one in VoIP becomes difficult to perform when many of the sub-frames in the radio frame with the frame number SFN satisfying "SFN mod(T/10)=0" are used for the multiple types of system information SI.

"Persistent Resource Allocation" is a scheme in which a Physical Resource Block (PRB) at a fixed frequency position is periodically (for example, a 20 ms cycle at which the VoIP packet arrives) allocated to a certain mobile station UE. This scheme allows reduction in overhead of a control channel (Physical Downlink Control Channel) which performs PRB allocation and MCS control.

"Persistent Resource Allocation" is particularly effective in reducing the overhead of a control channel when applied to a traffic in which packets of approximately the same size arrive periodically as in VoIP.

However, in order to effectively use "Persistent Resource Allocation," there is a need to always keep a particular PRB vacant at a cycle of PRB allocation.

For example, when a large amount of system information SI is transmitted at a cycle of 320 ms, PRB amount applicable for "Persistent Resource Allocation" is significantly limited.

DISCLOSURE OF THE INVENTION

The present invention has been made in view of the above-mentioned problems. An object of the present invention is to provide a mobile station and a radio base station capable of avoiding a situation in which multiple types of system information SI are transmitted in a concentrated manner in a certain radio frame in a mobile communication system employing the LTE system.

A first aspect of the present invention is summarized as a radio base station configured to transmit a first type of system information and one or a plurality of different types of system information to a mobile station, the radio base station comprise a transmission timing determination unit configured to determine a transmission radio frame for each of the different types of system information on the basis of an offset from a transmission timing of the first type of system information and a transmission cycle, and to determine a transmission sub-frame for each of the different types of system information in the determined transmission radio frame on the basis of scheduling information included in the first type of system information and a system information transmitter configured to transmit each of the different types of system information in the transmission sub-frame determined by the transmission timing determination unit the offset is set to a different value for every transmission cycle.

In the first aspect, wherein when a transmission cycle of one of the different types of system information k is Tk and the offset of the different type of system information k is Xk, the transmission timing determination unit determines a radio frame with a frame number SFNk satisfying "SFNk mod Tk=Xk" as the transmission radio frame for the different type of system information k.

In the first aspect, wherein when a length of the radio frame is T0, "Xk=(Tk/T0)/2)" is satisfied.

The radio base station according to claim 1, wherein when having determined the transmission radio frame for two or more of the different types of system information having the same transmission cycle, the transmission timing determination unit changes frame numbers of some of the determined transmission radio frames by a predetermined value.

In the first aspect, wherein the predetermined value Y satisfies "Y=(T1/T0)/2," where the transmission cycle of the first type of system information is T1.

In the first aspect, wherein the system information transmitter notifies the mobile station of whether or not the offset is applied by using the scheduling information in the first type of system information and when the system information transmitter makes a notification that the offset is not applied, the transmission timing determination unit determines a transmission radio frame for each of the different types of system information without using the offset.

A second aspect of the present invention is summarized as a mobile station configured to receive a first type of system information and one or a plurality of different types of system information from a radio base station, the mobile station comprise a reception timing determination unit configured to determine a reception radio frame for each of the different types of system information on the basis of an offset from a transmission timing of the first type of system information and a transmission cycle, and to determine a reception sub-frame for each of the different types of system information in the determined reception radio frame on the basis of scheduling information included in the first type of system information and a system information receiver configured to receive each of the different types of system information in the reception sub-frame determined by the reception timing determination unit, wherein the offset is set to a different value for every transmission cycle.

The mobile station according to claim 7, wherein when a transmission cycle of one of the different types of system information k is Tk and the offset of the different type of system information k is Xk, the reception timing determination unit determines a radio frame with a frame number SFNk satisfying "SFNk mod Tk=Xk" as the reception radio frame for the different type of system information k.

In the second aspect, wherein when a length of the radio frame is T0, "Xk=(Tk/T0)/2)" is satisfied.

In the second aspect, wherein when having determined the reception radio frame for two or more of the different types of system information having the same transmission cycle, the reception timing determination unit changes frame numbers of some of the determined reception radio frames by a predetermined value.

In the second aspect, wherein the predetermined value Y satisfies "Y=(T1/T0)/2," where the transmission cycle of the first type of system information is T1.

In the second aspect, wherein the system information receiver judges whether or not the offset is applied on the basis of the scheduling information included in the received first type of system information and when the system information receiver judges that the offset is applied, the reception timing determination unit determines a reception radio frame for each of the different types of system information without using the offset.

BEST MODE FOR CARRYING OUT THE INVENTION

Configuration of Mobile Communication System According to First Embodiment of Present Invention A configuration of a mobile communication system according to a first embodiment of the present invention is described with reference to FIGS. 2 to 6.

The mobile communication system according to the first embodiment of the present invention is a mobile communication system employing the LTE system. In the mobile communication system, as shown in FIG. 2, a radio base station eNB is configured to transmit a MIB to a mobile station UE via a BCH, and to transmit multiple types of system information to the mobile station UE via a DL-SCH.

Specifically, the radio base station eNB according to the present embodiment is configured to transmit one first type of system information SI-1 (SIB1) and one or multiple different types of system information SI-2 to SI-5 (SIB2 to SIB8) to the mobile station UE.

Here, it is supposed that four different types of system information SI-2 to SI-5 are used. However, how many different types of system information are used among the types of system information SI-2 and following signs is a matter which depends on usage.

Moreover, how to map SIB2 to SIB8 into the different types of system information SI-2 and following signs is also a matter which depends on usage.

Additionally, there is no need to broadcast all of the SIBs, and which SIBs among SIB2 to SIB8 are to be broadcasted also depends on usage. An operator only has to select the required numbers of SIBs and different types of system information, in accordance with the usage mode of the system.

Figure 3:
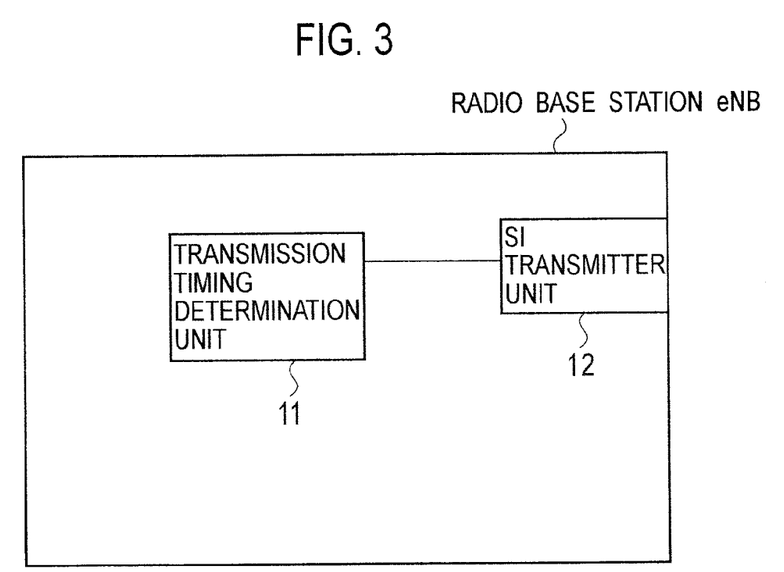
FIG. 3 is a functional block diagram of a radio base station according to a first embodiment of the present invention.

As shown in FIG. 3, the radio base station eNB according to the present embodiment includes a transmission timing determination unit 11 and a SI transmitter 12.

The transmission timing determination unit 11 is configured to determine a transmission radio frame for each of the different types of system information SI-2 to SI-5 on the basis of an offset from a transmission timing of the first type of system information SI-1 and a transmission cycle, and to determine a transmission sub-frame for each of the different types of system information SI-2 to SI-5 in the transmission radio frame thus determined therefor on the basis of scheduling information included in the first type of system information SI-1.

In the mobile communication system employing the LTE system, one radio frame length T0 is 10 ms, and one sub-frame is 1 ms. The radio frames are numbered respectively with frame numbers SFN (System Frame Numbers). A value of each SFN is broadcasted via the MIB. SFN is incremented for each radio frame (10 ms).

Specifically, the transmission timing determination unit 11 is configured to determine a radio frame with a frame number SFN satisfying "SFN mod(T1/T0)=0" as a transmission radio frame for the first type of system information SI-1. "T1" indicates the transmission cycle of the first type of system information SI-1, and "T1=80 ms" in LTE.

Moreover, the transmission timing determination unit 11 is configured to determine a radio frame with a frame number SFN satisfying "SFN mod(Tk/T0)=Xk" as a transmission radio frame for the k-th different type of system information. Here, "Tk" is the transmission cycle of the k-th different type of system information, and "Xk" is the timing offset for the k-th different type of system information from the transmission radio frame of the first type of system information SI-1.

Alternatively, Xk may be determined so as to satisfy "Xk= (Tk/T0)/2)". When this equation is applied in the mobile communication system employing the LTE system, "Xk= (Tk/20)" is obtained. In other words, each of the different types of system information is intended to be offset by SFN corresponding to half the transmission cycle of itself.

Figure 4:
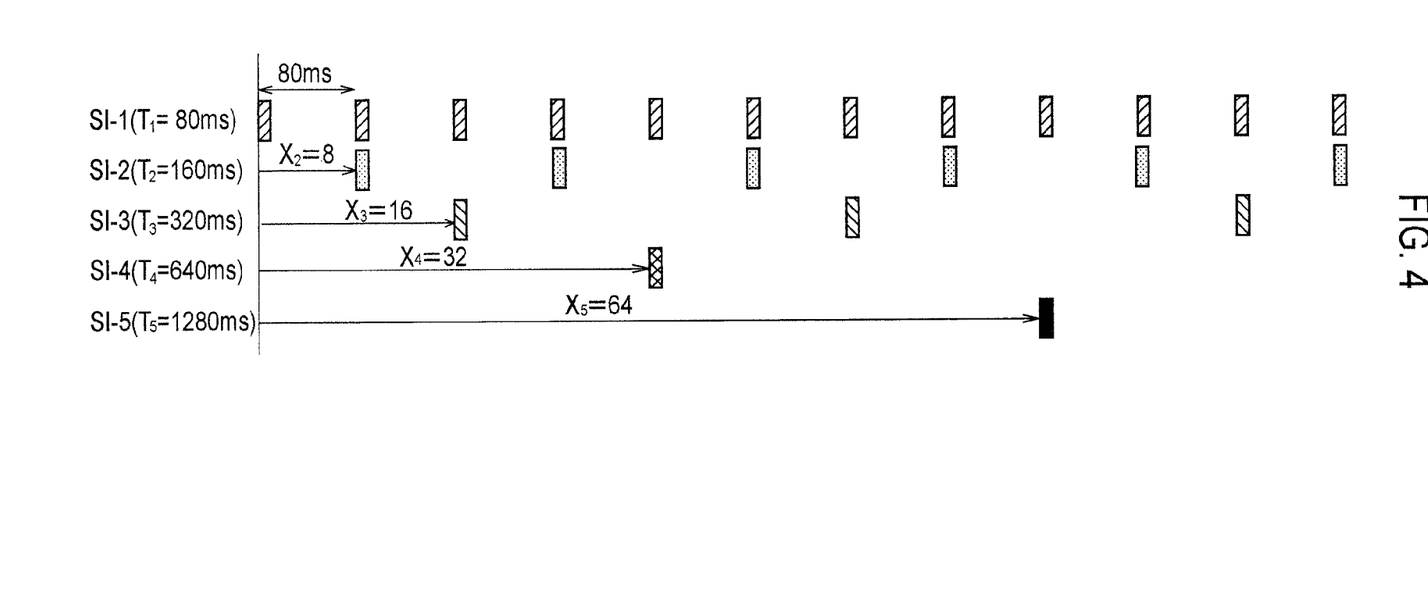
FIG. 4 is a view for explaining System Information transmitted by the radio base station according to the first embodiment of the present invention.

For example, in an example in FIG. 4, the transmission cycle T1 of the first type of system information SI-1 is "80 ms", the transmission cycle T2 of the second type of system information SI-2 is "160 ms", the transmission cycle T3 of the third type of system information SI-3 is "320 ms", the transmission cycle T4 of the fourth type of system information SI-4 is "640 ms", and the transmission cycle T5 of the fifth type of system information SI-5 is "1280 ms".

The offset X2 for the second type of system information SI-2 is "8 (=160/20)", the offset X3 for the third type of system information SI-3 is "16 (=320/20)", the offset X4 for the fourth type of system information SI-4 is "32 (=640/20)", and the offset X5 for the fifth type of system information SI-5 is "64 (=1280/20)".

As described above, the offset Xk from the first type of system information SI-1 is specified to a different value for each transmission cycle Tk.

In contrast, when determining the transmission radio frames for the multiple different types of system information SI-2 to SI-5 having the same transmission cycle, the transmission timing determination unit 11 may change some of the frame numbers of the determined transmission radio frames by a predetermined value Y.

In other words, for some of the different types of system information, the transmission timing determination unit 11 may be configured to determine a radio frame with a frame number SFN satisfying "SFN mod(Tk/T0)=Xk" and "Xk= (Tk/T0)/2+Y" as the transmission radio frame for the k-th different type of system information.

For example, for a certain type of system information, the transmission timing determination unit 11 may change the frame number of the determined transmission radio frame by the predetermined value Y, when an odd number of types of system information having the same transmission cycle are included in the types of system information SI-2 and following signs before the certain type of system information.

The predetermined value Y may be "Y (=(T1/T0)/2)" which corresponds to a value that is half the transmission cycle of the first type of system information SI-1. When the transmission cycle T1 of the first type of system information SI-1 is "80 ms," the predetermined value Y is "4 (=(80/10)/2)".

Figure 5:
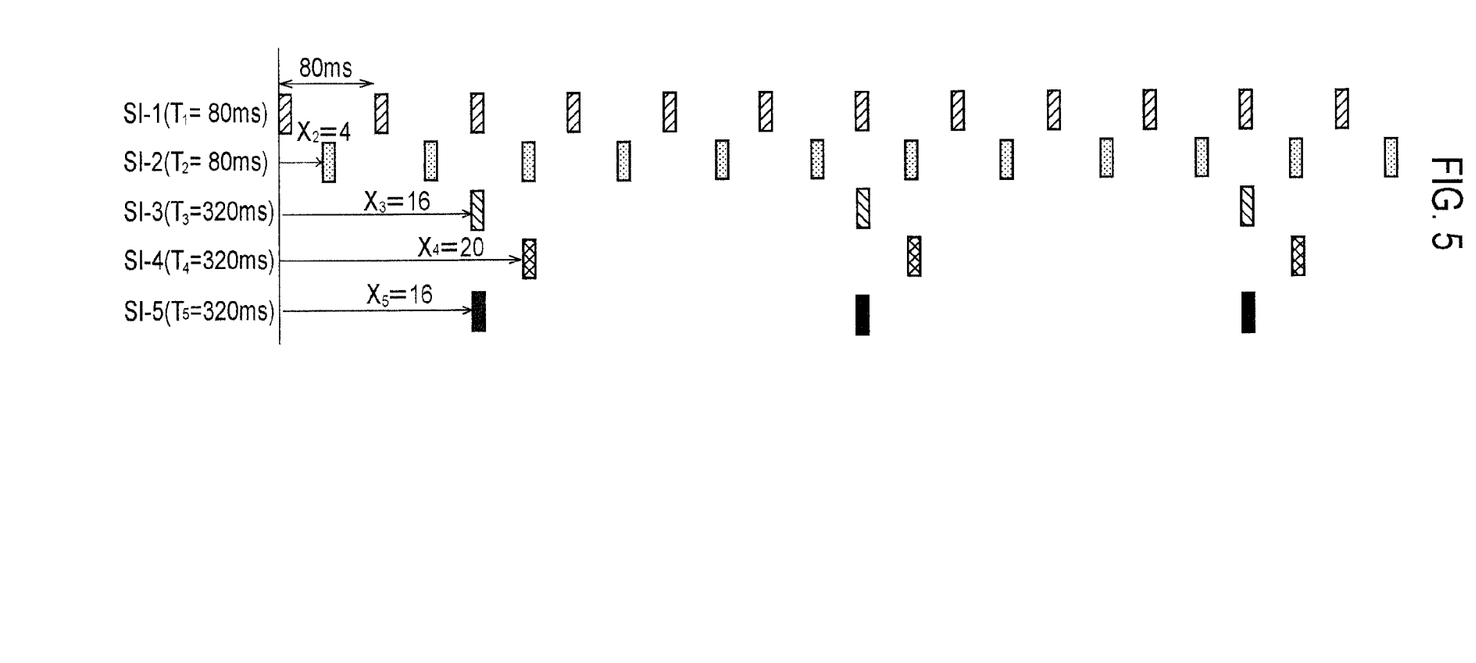
FIG. 5 is a view for explaining System Information transmitted by the radio base station according to the first embodiment of the present invention.

For example, in an example in FIG. 5, the transmission cycle T1 of the first type of system information SI-1 is "80 ms", the transmission cycle T2 of the second type of system information SI-2 is "80 ms", the transmission cycle T3 of the third type of system information SI-3 is "320 ms", the transmission cycle T4 of the fourth type of system information SI-4 is "320 ms", and the transmission cycle T5 of the fifth type of system information SI-5 is "320 ms".

The offset X2 for the second type of system information SI-2 is "4 (=80/20)", the offset X3 for the third type of system information SI-3 is "16 (=320/20)", the offset X4 for the fourth type of system information SI-4 is "20 (=320/20+4)", and the offset X5 for the fifth type of system information SI-5 is "16 (=320/20)".

Specifically, the transmission timing determination unit 11 determines the offset amount X4 for each transmission radio frames for the fourth type of system information SI-4 as "320/20+4=20". The transmission timing determination unit 11 applies an offset of Y=4 to the fourth type of system information SI-4. This is because an odd number (one) of types of system information having the same transmission cycle are included in the types of system information SI-2 and following signs before the fourth type of system information SI-4.

On the other hand, the transmission timing determination unit 11 determines the offset amount X5 for each transmission radio frames for the fifth type of system information SI-5 as "320/20=16". The transmission timing determination unit 11 does not apply an offset of Y=4 to the fifth type of system information SI-5. This is because an even number (two) of types of system information having the same transmission cycle are included in the types of system information SI-2 and following signs before the fifth type of system information SI-5.

The SI transmitter 12 is configured to transmit the different types of system information SI-2 to SI-5 by use of the transmission sub-frames determined by the transmission timing determination unit 11.

In addition, the SI transmitter 12 may be configured to use the scheduling information in the first type of system information SI-1 to notify the mobile station UE of whether or not the above-mentioned offset Xk is applied.

Here, assume a case where the SI transmitter 12 is configured to use the scheduling information in the first type of system information SI-1 (SIB1) to notify the mobile station UE that the above-mentioned offset Xk is not applied. In this case, the transmission timing determination unit 11 is configured to determine the transmission radio frames for the different types of system information SI-2 to SI-5 without using the offset Xk.

Note that, the SI transmitter 12 may be configured to notify the mobile station UE of whether the above-mentioned offset Xk is applied or not for each of different types of system information SI-2 to SI-5, or for all the different types of system information SI-2 to SI-5 in common.

For example, the SI transmitter 12 may be configured to notify the mobile station UE of whether the above-mentioned offset Xk is applied or not by use of an information element "SFN offset indicator" in the "Scheduling Information" in SIB1.

The mobile station UE according the present embodiment is configured to receive one first type of system information SI-1 and one or multiple different types of system information SI-2 to SI-5 from the radio base station eNB.

Figure 6:
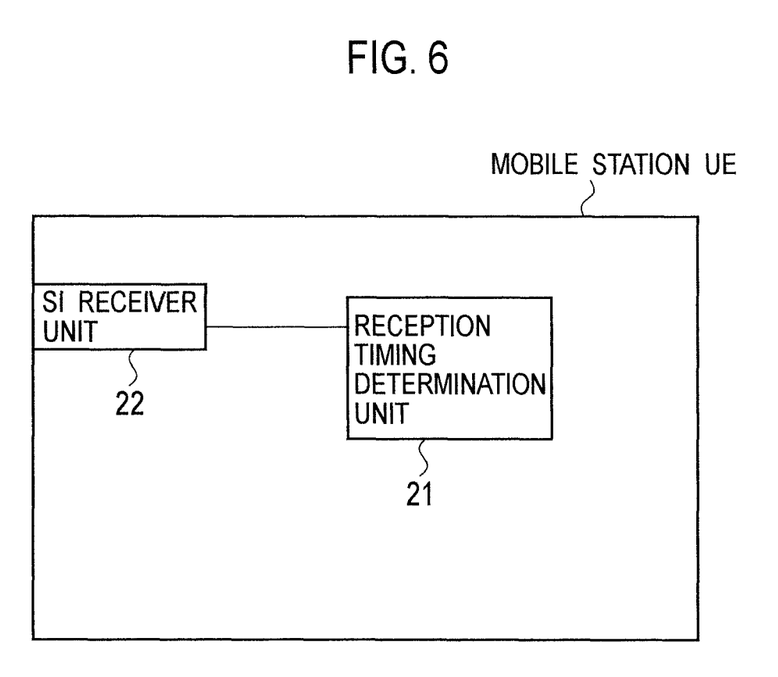
FIG. 6 is a functional block diagram of a mobile station according to the first embodiment of the present invention.

As shown in FIG. 6, the mobile station UE according to the present embodiment includes a reception timing determination unit 21 and an SI receiver 22.

The reception timing determination unit 21 is configured to determine a reception radio frame for each of the different types of system information SI-2 to SI-5 on the basis of an offset from a transmission timing of the first type of system information SI-1 and a transmission cycle, and to determine a reception sub-frame for each of the different types of system information SI-2 to SI-5 in the reception radio frame thus determined therefor on the basis of scheduling information included in the first type of system information SI-1.

Specifically, the reception timing determination unit 21 is configured to determine a radio frame with a frame number SFN satisfying "SFN mod Tk=Xk" as a reception radio frame for the k-th different type of system information. Here, "Tk" is the transmission cycle of the k-th different type of system information, and "Xk" is the offset for the k-th different type of system information from the transmission timing of the first type of system information SI-1.

The reception timing determination unit 21 may be configured in the following manner as similar to the above-mentioned transmission timing determination unit 11. Specifically, when determining the transmission radio frames for the multiple different types of system information SI-2 to SI-5 having the same transmission cycle, the reception timing determination unit 21 may change some of the frame numbers of the determined reception radio frames by a predetermined value Y.

For example, for a certain type of system information, the reception timing determination unit 21 may change the frame number of the determined reception radio frame by the predetermined value Y, when an odd number of types of system information having the same transmission cycle are included in the types of system information SI-2 and following signs before the certain type of system information.

For example, in an example in FIG. 5, the transmission cycle T1 of the first type of system information SI-1 is "80 ms", the transmission cycle T2 of the second type of system information SI-2 is "80 ms", the transmission cycle T3 of the third type of system information SI-3 is "320 ms", the transmission cycle T4 of the fourth type of system information SI-4 is "320 ms", and the transmission cycle T5 of the fifth type of system information SI-5 is "320 ms".

The offset X2 for the second type of system information SI-2 is "4 (=80/20)", the offset X3 for the third type of system information SI-3 is "16 (=320/20)", the offset X4 for the fourth type of system information SI-4 is "20 (=320/20+4)", and the offset X5 for the fifth type of system information SI-5 is "16 (=320/20)".

Specifically, the reception timing determination unit 21 determines the offset amount X4 for each reception radio frames for the fourth type of system information SI-4 as "320/20+4=20". The reception timing determination unit 21 applies an offset of Y=4 to the fourth type of system information SI-4. This is because an odd number (one) of types of system information having the same transmission cycle are included in the types of system information SI-2 and following signs before the fourth type of system information SI-4.

On the other hand, the reception timing determination unit 21 determines the offset amount X5 for each reception radio frames for the fifth type of system information SI-5 as "320/20=16". The reception timing determination unit 21 does not apply an offset of Y=4 to the fifth type of system information SI-5. This is an even number (two) of types of system information having the same transmission cycle are included in the types of system information SI-2 and following signs before the fifth type of system information SI-5.

The SI receiver 22 is configured to receive the different types of system information SI-2 to SI-5 by use of the reception sub-frames determined by the reception timing determination unit 21.

In addition, the SI receiver 22 may be configured to judge whether or not the above-mentioned offset Xk is applied on the basis of the scheduling information included in the first type of system information SI-1 (SIB1) thus received.

Here, when the SI receiver 22 judges that the above-mentioned offset Xk is applied, the reception timing determination unit 21 is configured to determine the reception radio frames for the different types of system information SI-2 to SI-5 without using the offset Xk.

(Advantageous Effects of Mobile Communication System According to First Embodiment of Present Invention)

According to the mobile communication system of the first embodiment of the present invention, a different offset Xk is set for each of the transmission cycles Tk of the respective different types of system information SI-2 to SI-5, and the transmission timing of each of the different types of system information SI-2 to SI-5 is determined based on the transmission cycle Tk and the offset Xk. Accordingly, the mobile communication system of the first embodiment of the present invention is capable of avoiding a situation where the multiple different types of system information SI-2 to SI-5 are transmitted in a concentrated manner in a certain radio frame.

Accordingly, the mobile communication system of the first embodiment of the present invention can secure a PRB amount allocatable in "Persistent Resource Allocation."

Meanwhile, in terms of battery power consumption of the mobile station during the reception of the system information, it is desirable that the system information is received collectively in one reception, as far as possible. Thus, the application of the offset Xk is made settable while taking into consideration of the radio resource amount needed for the "Persistent Resource Allocation". Accordingly, trade-off between the battery saving and the effect of the "Persistent Resource Allocation" can be flexibly set. This allows reduction in overhead as compared to a case where the value of the offset Xk itself is broadcasted.

(Modification)

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

All content of the Japanese patent application 2008-076895 (Filing date is 24 Mar. 2008) are described into this application by the reference.

INDUSTRIAL APPLICABILITY

As described above, the present invention can provide a mobile station and a radio base station which are capable of avoiding a situation where multiple types of information SI are transmitted in a concentrated manner in a certain radio frame.

The invention claimed is:

1. A radio base station configured to transmit a first type of system information and one or a plurality of different types of system information to a mobile station, the radio base station comprising:
a transmission timing determination unit configured to determine a transmission radio frame for each of the different types of system information on the basis of an offset from a transmission timing of the first type of system information and a transmission cycle, and to determine a transmission sub-frame for each of the different types of system information in the determined transmission radio frame on the basis of scheduling information included in the first type of system information; and
a system information transmitter configured to transmit each of the different types of system information in the transmission sub-frame determined by the transmission timing determination unit, wherein
the offset is set to a different value for every transmission cycle.

2. The radio base station according to claim 1, wherein when a transmission cycle of one of the different types of system information k is Tk and the offset of the different type of system information k is Xk, the transmission timing determination unit determines a radio frame with a frame number SFNk satisfying "SFNk mod Tk=Xk" as the transmission radio frame for the different type of system information k.

3. The radio base station according to claim 2, wherein when a length of the radio frame is T0, "Xk=(Tk/T0)/2)" is satisfied.

4. The radio base station according to claim 1, wherein when having determined the transmission radio frame for two or more of the different types of system information having the same transmission cycle, the transmission timing determination unit changes frame numbers of some of the determined transmission radio frames by a predetermined value Y.

5. The radio base station according to claim 4, wherein the predetermined value Y satisfies "Y=(T1/T0)/2," where the transmission cycle of the first type of system information is T1 and a length of the radio frame is T0.

6. The radio base station according to claim 1, wherein the system information transmitter notifies the mobile station of whether or not the offset is applied by using the scheduling information in the first type of system information, and
when the system information transmitter makes a notification that the offset is not applied, the transmission timing determination unit determines a transmission radio frame for each of the different types of system information without using the offset.

7. A mobile station configured to receive a first type of system information and one or a plurality of different types of system information from a radio base station, the mobile station comprising:
a reception timing determination unit configured to determine a reception radio frame for each of the different types of system information on the basis of an offset from a transmission timing of the first type of system information and a transmission cycle, and to determine a reception sub-frame for each of the different types of system information in the determined reception radio frame on the basis of scheduling information included in the first type of system information; and
a system information receiver configured to receive each of the different types of system information in the reception sub-frame determined by the reception timing determination unit, wherein
the offset is set to a different value for every transmission cycle.

8. The mobile station according to claim 7, wherein when a transmission cycle of one of the different types of system information k is Tk and the offset of the different type of system information k is Xk, the reception timing determination unit determines a radio frame with a frame number SFNk satisfying "SFNk mod Tk=Xk" as the reception radio frame for the different type of system information k.

9. The mobile station according to claim 8, wherein when a length of the radio frame is T0, "Xk=(Tk/T0)/2)" is satisfied.

10. The mobile station according to claim 7, wherein when having determined the reception radio frame for two or more of the different types of system information having the same transmission cycle, the reception timing determination unit changes frame numbers of some of the determined reception radio frames by a predetermined value.

11. The mobile station according to claim 10, wherein the predetermined value Y satisfies "Y=(T1/T0)/2," where the transmission cycle of the first type of system information is T1 and a length of the radio frame is T0.

12. The mobile station according to claim 7, wherein the system information receiver judges whether or not the offset is applied on the basis of the scheduling information included in the received first type of system information, and
when the system information receiver judges that the offset is applied, the reception timing determination unit determines a reception radio frame for each of the different types of system information without using the offset.

* * * * *